(12) United States Patent
Kokkinos et al.

(10) Patent No.: US 10,693,538 B2
(45) Date of Patent: Jun. 23, 2020

(54) APPARATUS, METHOD AND COMPUTER PROGRAM FOR GENERATING BROADCAST BEAMS

(71) Applicant: Huawei Technologies Co., Ltd., Shenzhen (CN)

(72) Inventors: Titos Kokkinos, Munich (DE); Christoph Spranger, Munich (DE); Bruno Biscontini, Munich (DE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/416,886

(22) Filed: May 20, 2019

(65) Prior Publication Data

US 2019/0273538 A1 Sep. 5, 2019

Related U.S. Application Data

(63) Continuation of application No. PCT/EP2016/080323, filed on Dec. 8, 2016.

(51) Int. Cl.
*H04B 7/0456* (2017.01)
*H04B 7/0408* (2017.01)
(Continued)

(52) U.S. Cl.
CPC ............ *H04B 7/0469* (2013.01); *H01Q 1/246* (2013.01); *H01Q 3/36* (2013.01); *H01Q 21/062* (2013.01); *H04B 7/0408* (2013.01)

(58) Field of Classification Search
CPC .. H01Q 21/065; H01Q 9/0407; H01Q 9/0435; H01Q 9/0478; H04B 7/0469; H04B 7/10; H04B 7/0452
See application file for complete search history.

(56) References Cited

U.S. PATENT DOCUMENTS

| 5,649,287 A | 7/1997 | Forssen et al. |
| 2015/0230266 A1 | 8/2015 | Sung et al. |

(Continued)

FOREIGN PATENT DOCUMENTS

| CN | 1096719 C | 12/2002 |
| CN | 101359947 A | 2/2009 |

(Continued)

OTHER PUBLICATIONS

Tzanidis et al, "CRS Precoding Weights for Wide Beam Coverage in FD-MIMO Antenna Arrays," pp. 123-124, Institute of Electrical and Electronics Engineers, New York, New York (2015).

(Continued)

*Primary Examiner* — Aristocratis Fotakis

(74) *Attorney, Agent, or Firm* — Leydig, Voit & Mayer, Ltd.

(57) ABSTRACT

An apparatus generates a first broadcast beam by feeding a first broadcast beam signal to a first set of dual polarized antenna elements at a first input for a first polarization and a second set of dual polarized antenna elements at a second input for a second polarization. The apparatus generates a second broadcast beam by feeding a second broadcast beam signal to a third set of dual polarized antenna elements at a first input for the first polarization and to a fourth set of dual polarized antenna elements at a second input for the second polarization.

20 Claims, 11 Drawing Sheets

$z_{mn}$    z = broadcast beam ($x=1^{st}$ broadcast beam, $y=2^{nd}$ broadcast beam)
m = set of dual polarized antenna elements
n = column of the set

(51) Int. Cl.
*H01Q 3/36* (2006.01)
*H01Q 1/24* (2006.01)
*H01Q 21/06* (2006.01)

(56) References Cited

U.S. PATENT DOCUMENTS

| | | |
|---|---|---|
| 2015/0280802 A1 | 10/2015 | Thomas et al. |
| 2016/0233917 A1* | 8/2016 | Moon .................... H01Q 3/24 |
| 2016/0337017 A1* | 11/2016 | Moon .................. H04B 7/0617 |
| 2017/0222703 A1 | 8/2017 | Thomas et al. |
| 2017/0244462 A1* | 8/2017 | Wei ..................... H04B 7/0469 |
| 2017/0310374 A1* | 10/2017 | Kim .................... H04L 25/0204 |
| 2017/0352953 A1* | 12/2017 | Petersson ............ H04B 7/0617 |
| 2018/0026693 A1* | 1/2018 | Petersson ............ H04B 7/0617 |
| | | 375/295 |
| 2018/0062728 A1* | 3/2018 | Kim ....................... H04B 7/04 |
| 2018/0090853 A1* | 3/2018 | Sihlbom .............. H04B 7/0469 |

FOREIGN PATENT DOCUMENTS

| | | |
|---|---|---|
| CN | 101783694 A | 7/2010 |
| CN | 106105065 A | 11/2016 |
| WO | 0189030 A1 | 11/2001 |
| WO | 2016141961 A1 | 9/2016 |

OTHER PUBLICATIONS

Tzanidis et al, "2D Active Antenna Array Design for FD-MIMO System and Antenna Virtualization Techniques," International Journal of Antennas and Propagation, vol. 2015, Article ID 873530, Hindawi Publishing Corporation (May 13, 2015).

\* cited by examiner

Sub-Beam 1

Sub-Beam 2

Broadcast Beam

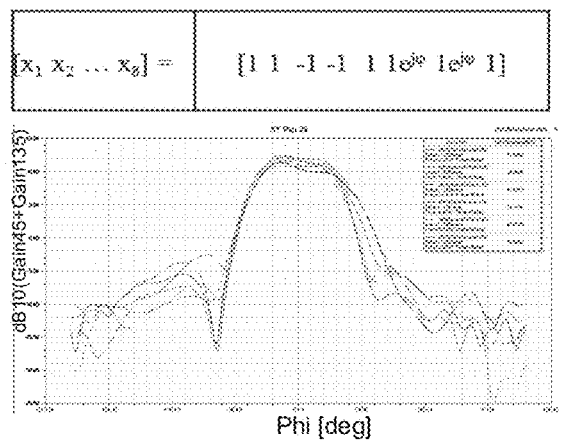
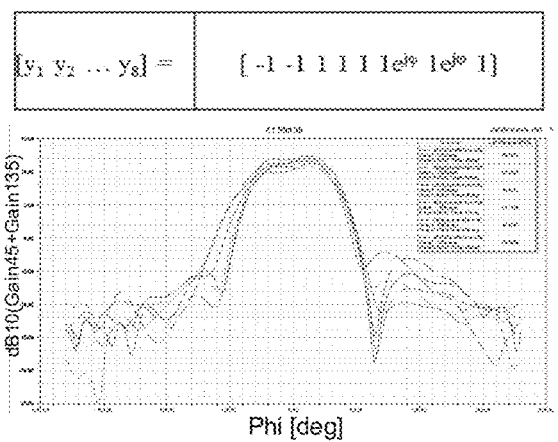
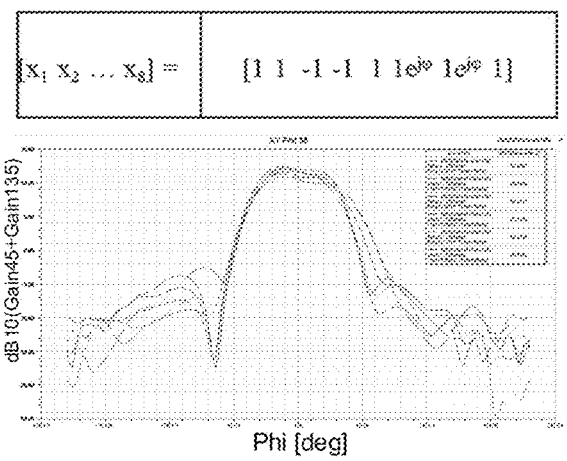
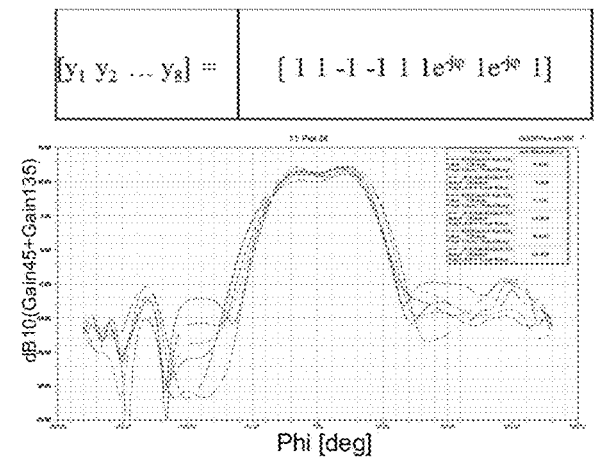
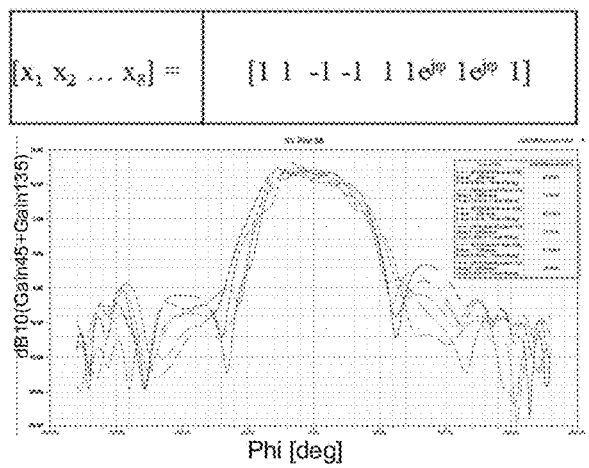
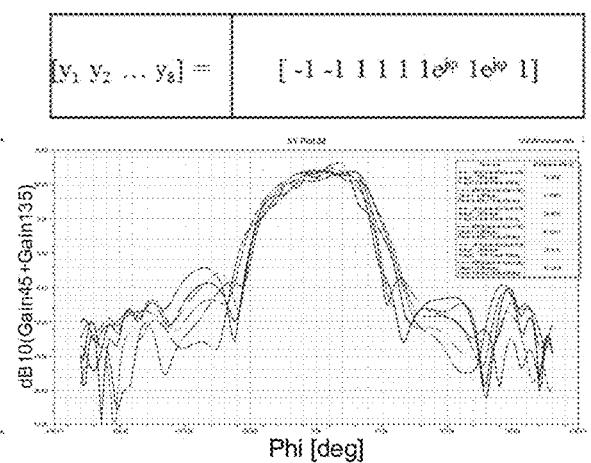
FIG. 7

APPARATUS, METHOD AND COMPUTER PROGRAM FOR GENERATING BROADCAST BEAMS

CROSS-REFERENCE TO RELATED APPLICATIONS

This application is a continuation of International Application No. PCT/EP2016/080323, filed on Dec. 8, 2016, the disclosure of which is hereby incorporated by reference in its entirety.

TECHNICAL FIELD

The present disclosure is directed to an apparatus for generating broadcast beams, an active antenna comprising the apparatus for generating broadcast beams and an antenna element array connected to the apparatus, a method for generating broadcast beams and a computer program for causing the apparatus to generate broadcast beams.

BACKGROUND

In full-dimension MIMO systems (massive MIMO systems) there are control and reference signals that are specific to individual users, but there are also control and reference signals that are specific to the complete cell (e.g. so called cell-specific reference signals/CRS). The cell-specific reference signals are usually transmitted on dedicated logical antenna ports, which bypass the user's precoding. The size and shape of a cell is actually defined as the area in which these signals are transmitted. Therefore, the shape of the beams that carry these cell-specific signals (in form of broadcast beams) should be stable and comply with tough requirements to meet specifications. These specifications are derived from the network planning requirements, and assuming that massive MIMO mobile networks will follow today's cellular approach, it should be expected that the main broadcast beam of massive MIMO networks will follow the specifications of today's antenna panels (3 dB horizontal beamwidth (hor. BW.) of 60 degrees, 10 dB hor. BW. of 120 degrees etc.). Therefore, the shaping of the broadcast beams for massive MIMO antennas is an important and system relevant step and is accomplished by exciting the physical antenna ports with the right amplitudes and weights, which satisfy the requirements for the broadcast beam and also maximize the output power of the transmitting amplifiers.

However, in current MIMO systems, phase and amplitude errors occur, for example in phase or amplitude calibration processes of the signals fed to the antenna element array.

SUMMARY

Therefore, it is an objective of the present disclosure to provide an arrangement, which is more robust against phase and amplitude errors.

This objective is achieved by the subject matter of independent claims. Advantageous implementations of the present disclosure are further defined in the respective dependent claims.

In a first aspect an apparatus for generating broadcast beams is provided, which is configured to:

select out of an antenna element array a first set of dual polarized antenna elements and a third set of dual polarized antenna elements each being arranged in a different half of the antenna element array;

select out of the antenna element array a second set of dual polarized antenna elements and a fourth set of dual polarized antenna elements each being arranged in a different half of the antenna element array;

generate a first broadcast beam by feeding with a first broadcast beam signal the first set of dual polarized antenna elements at a first input for a first polarization and the second set of dual polarized antenna elements at a second input for a second polarization;

generate a second broadcast beam by feeding with a second broadcast beam signal the third set of dual polarized antenna elements at a first input for the first polarization and the fourth set of dual polarized antenna elements at a second input for the second polarization;

wherein the second polarization is orthogonal to the first polarization.

In other words, each dual polarized antenna element is adapted to broadcast signals with the first polarization as well as the second polarization. Each dual polarized antenna element has a first input and a second input. The first input feeds signals to the respective elements of the antenna which radiate with the first polarization and the second input feeds signals to the respective elements of the antenna which radiate with the second polarization. The apparatus for generating broadcast beams according to the first aspect of the present disclosure and its implementation forms can be any kind of control or processing means or element implemented in any kind of device for transmitting broadcast beams. For example, the apparatus for generating broadcast beams according to the first aspect can be implemented in a base station of a wireless communication system, or any other potential stationary or mobile station for transmitting broadcast beams to other entities of the communication system.

By the described selecting of the antenna elements and the corresponding feeding the symmetric properties of an antenna array used are fully utilized as it is ensured that the antenna elements used for generating the two different broadcast beams are equally arranged by choosing the sets of antenna elements being located in the different halves of the antenna array. Hence, configurations are avoided in which for example one broadcast beam is generated only with outer elements of an antenna array and the other one is generated only with inner elements of the antenna array— leading to different characteristics for the broadcast beams.

Therefore, due to the arrangement of the apparatus of the first aspect, a first and second broadcast beam are generated, which are both robust against amplitude and phase changes of the signals fed to the antenna element array. In particular, the zeros of an antenna pattern are quite sensitive to these phase and amplitude changes and the present disclosure provides for an arrangement, which also minimizes the number of zeros in the radiation patterns which are used to generate the broadcast beams, so that the first and second broadcast beams are insensitive to phase and amplitude changes.

In a first implementation form of the first aspect, the apparatus is further configured to select the first and second set of dual polarized elements such that they are the same set being arranged in a first half of the antenna array and the third and fourth set of dual polarized antenna elements such that they are the same set being arranged in a second half of the antenna array; or select the first and fourth set of dual polarized elements such that they are the same set being arranged in a first half of the antenna array and the second and third set of dual polarized antenna elements such that they are the same set being arranged in a second half of the antenna array.

In a second implementation form of the first aspect or according to the first implementation form of the first aspect, the apparatus is further configured to select the sets of dual polarized antenna elements such that each set comprises at least two columns and at least one row of dual polarized antenna elements, wherein the first inputs of dual polarized antenna elements in the same column are configured to receive the same signal and the first inputs of dual polarized antenna elements in the same row are separated from each other and the second inputs of dual polarized antenna elements in the same column are configured to receive the same signal and the second inputs of dual polarized antenna elements in the same row are separated from each other.

In a third implementation form according to the second implementation form of the first aspect, the apparatus is further configured to generate the first broadcast beam by feeding the first broadcast signal to the first inputs of at least a first column of the first set of dual polarized antenna elements and to the second inputs of at least a first column of the second set of dual polarized antenna elements as it is and by feeding the first broadcast signal to the first inputs of at least a second column of the first set of dual polarized antenna elements and to the second inputs of at least a second column of the second set of dual polarized antenna elements with a phase shift applied to the first broadcast beam signal; and
generate the second broadcast beam by feeding the second broadcast signal to the first inputs of at least a first column of the third set of dual polarized antenna elements and to the second inputs of at least a first column of the fourth set of dual polarized antenna elements as it is and by feeding the second broadcast signal to the first inputs of at least a second column of the third set of dual polarized antenna elements and to the second inputs of at least a second column of the fourth set of dual polarized antenna elements with a phase shift applied to the second broadcast beam signal.

In a fourth implementation form according to the third implementation form of the first aspect, the apparatus is further configured to
apply a phase shift of 180 degree to the first broadcast beam signal before feeding it to the first inputs of the at least second column of the first set of dual polarized antenna elements; and
apply a phase shift of 180 degree to the second broadcast beam signal before feeding it to the first inputs of the at least second column of the third set of dual polarized antenna elements.

In a fifth implementation form according to the third or fourth implementation form of the first aspect, the apparatus is further configured to
apply a first phase shift to the first broadcast beam signal before feeding it to the first inputs of the at least second column of the first set of dual polarized antenna elements and a second phase shift to the first broadcast beam signal before feeding it to the second inputs of the at least second column of the second set of dual polarized antenna elements, wherein the first phase shift and the second phase shift are different from each other; and
apply a third phase shift to the second broadcast beam signal before feeding it to the first inputs of the at least second column of the third set of dual polarized antenna elements and a fourth phase shift to the second broadcast beam signal before feeding it to the second inputs of the at least second column of the fourth set of dual polarized antenna elements, wherein the third phase shift and the fourth phase shift are different from each other.

In a sixth implementation form according to the fifth implementation form of the first aspect, the first phase shift and third phase shift are equal and the second phase shift and the fourth phase shift are also equal.

In a seventh implementation form according to the first aspect as such or according to any preceding implementation form of the first aspect, the apparatus is further configured to select the sets of dual polarized antenna elements such that each dual polarized antenna element of the antenna element array is comprised in exactly two of the sets of dual polarized antenna elements. In other words, this implementation form uses the complete antenna array.

In an eighth implementation form according to the first aspect as such or according to any preceding implementation form of the first aspect, the apparatus is further configured to feed the first broadcast beam signal and the second broadcast beam signal to the inputs of the dual polarized antenna elements having the same excitation amplitude.

In a second aspect, an active antenna is provided comprising the apparatus according to the first aspect or the implementation forms of the first aspect and the antenna element array connected to the apparatus.

In a first implementation form of the second aspect, the antenna element array is a Massive Multiple-Input Multiple-Output, Massive MIMO, antenna element array. For example, this antenna element array is symmetric in the sense that its two halves are arranged in symmetry to the central axis in relation to each other. This may also include symmetry in the dual polarized antenna elements in each half, i.e. the same number of such elements in a vertical and a horizontal direction in each half. Advantageously, all of these elements are identical to each other regarding their structure. Other geometries of the antenna element array, however, may also be functional under the present disclosure and are thus covered.

In a second implementation form according to the first aspect as such or according to the first implementation form of the second aspect, the active antenna further comprises at least a further antenna element arranged between the dual-polarized antenna elements of the antenna element array. This at least one further antenna element is for example at least one dipole antenna element.

In a third implementation form according to the second implementation form of the second aspect, the operating frequency of the further antenna element is different from and preferably smaller than the operating frequency of the dual-polarized antenna elements.

In a third aspect a method for generating broadcast beams performed by an apparatus for generating the broadcast beams is provided, wherein the method comprises:
selecting out of an antenna element array a first set of dual polarized antenna elements and a third set of dual polarized antenna elements each being arranged in a different half of the antenna element array;
selecting out of the antenna element array a second set of dual polarized antenna elements and a fourth set of dual polarized antenna elements each being arranged in a different half of the antenna element array;
generating a first broadcast beam by feeding with a first broadcast beam signal the first set of dual polarized antenna elements at a first input for a first polarization and the second set of dual polarized antenna elements at a second input for a second polarization;
generating a second broadcast beam by feeding with a second broadcast beam signal the third set of dual polarized antenna elements at a first input for the first polarization and the fourth set of dual polarized antenna elements at a second input for the second polarization;

wherein the second polarization is orthogonal to the first polarization.

Accordingly, a method is provided which generates a first and second broadcast beam, which are robust against phase and amplitude changes.

In a fourth aspect a computer program for causing an apparatus for generating broadcast beams to perform a process is provided, wherein the process comprises:

selecting out of an antenna element array a first set of dual polarized antenna elements and a third set of dual polarized antenna elements each being arranged in a different half of the antenna element array;

selecting out of the antenna element array a second set of dual polarized antenna elements and a fourth set of dual polarized antenna elements each being arranged in a different half of the antenna element array;

generating a first broadcast beam by feeding with a first broadcast beam signal the first set of dual polarized antenna elements at a first input for a first polarization and the second set of dual polarized antenna elements at a second input for a second polarization;

generating a second broadcast beam by feeding with a second broadcast beam signal the third set of dual polarized antenna elements at a first input for the first polarization and the fourth set of dual polarized antenna elements at a second input for the second polarization;

wherein the second polarization is orthogonal to the first polarization.

Further, all the implementation forms of the first aspect mentioned above contribute for arriving at the advantages already mentioned with respect to the first aspect. Also, all the implementation forms of the first aspect form implementation forms of the third and the fourth aspect of the disclosure. Generally, it has to be noted that all arrangements, devices, elements, units and means and so forth described in the present application could be implemented by software or hardware elements or any kind of combination thereof. All steps, which are performed by the various entities described in the present application, as well as the functionality described to be performed by the various entities are intended to mean that the respective entity is adapted to or configured to perform the respective steps of functionalities. Even if in the following description of specific embodiments a specific functionality or step to be performed by a general entity is not reflected in the description of a specific detailed element of that entity, which performs that specific step or functionality, it should be clear for a skilled person that these elements and functionalities can be implemented in respective hardware or software elements or any kind of combination thereof. Further, the method of the present disclosure and its various steps are embodied in the functionalities of the various described apparatus elements.

BRIEF DESCRIPTION OF DRAWINGS

The above-described aspects and implementation forms of the present disclosure will be explained in the following description of specific embodiments in relation to the enclosed drawings.

FIG. 7 shows different sets of excitation vectors and the corresponding radiation patterns according to an embodiment of the present disclosure;

DETAILED DESCRIPTION

The general idea of the present disclosure is to generate broadcast beams by means of feeding broadcast beam signals to dual polarized antenna elements of an antenna element array in a specific manner. In the embodiments explained below, two broadcast beams are generated and radiated from a respective half of a symmetrical antenna element array $1$, $1'$, $1''$. Each antenna element array $1$, $1'$ $1''$ consists of a number of identical dual polarized antenna elements $2$, $2a$-$2d$ (or in short referred as antenna elements), which are symmetrically arranged in the two halves of the respective antenna element array $1$, $1'$, $1''$. Each dual polarized antenna element $2$, $2a$, $2b$, $2c$, or $2d$ has a structure which enables the radiation of signals in two polarization directions, which are orthogonal (perpendicular) in respect to each other. In the following figures, this is visualized by two arrows in each antenna element $2$, $2a$, $2b$, $2c$, or $2d$, which are crossing each other in a 90° angle, thus visualizing the two orthogonal polarization directions. The first polarization direction is fed by respective inputs $3$, $3a$-$3d$ and the second polarization direction is fed by respective inputs $4a$-$4d$ of each dual polarized antenna element $2$, $2a$, $2b$, $2c$, or $2d$. In the following description and the claims, the first polarization direction and the second polarization direction are also called first polarization and second polarization, respectively.

Each of the generated broadcast beams consist of two respective sub beams. Hence, in sum four sub beams are generated. Each sub beam is generated in half of the antenna element arrays 1, 1', 1". Hence, in each half of the antenna element arrays 1, 1', 1" two sub beams are generated which belong to the same broadcast beam (e.g. first sub beam of first broadcast beam and second sub beam of first broadcast beam are generated in the first half and first sub beam of second broadcast beam and second sub beam of second broadcast beam are generated in the second half or vice versa) or to different broadcast beams (e.g. first sub beam of first broadcast beam and second sub beam of second broadcast beam are generated in the first half and second sub beam of first broadcast beam and first sub beam of second broadcast beam are generated in the second half or vice versa). The sub beams are respectively generated by a selective feeding, by an apparatus 10, of a first and a second broadcast beam signal to the respective inputs 3, 3a-3d and, 4 4a-4d of the various antenna elements 2, 2a-2d, as will be explained in further detail below.

Figure 1:
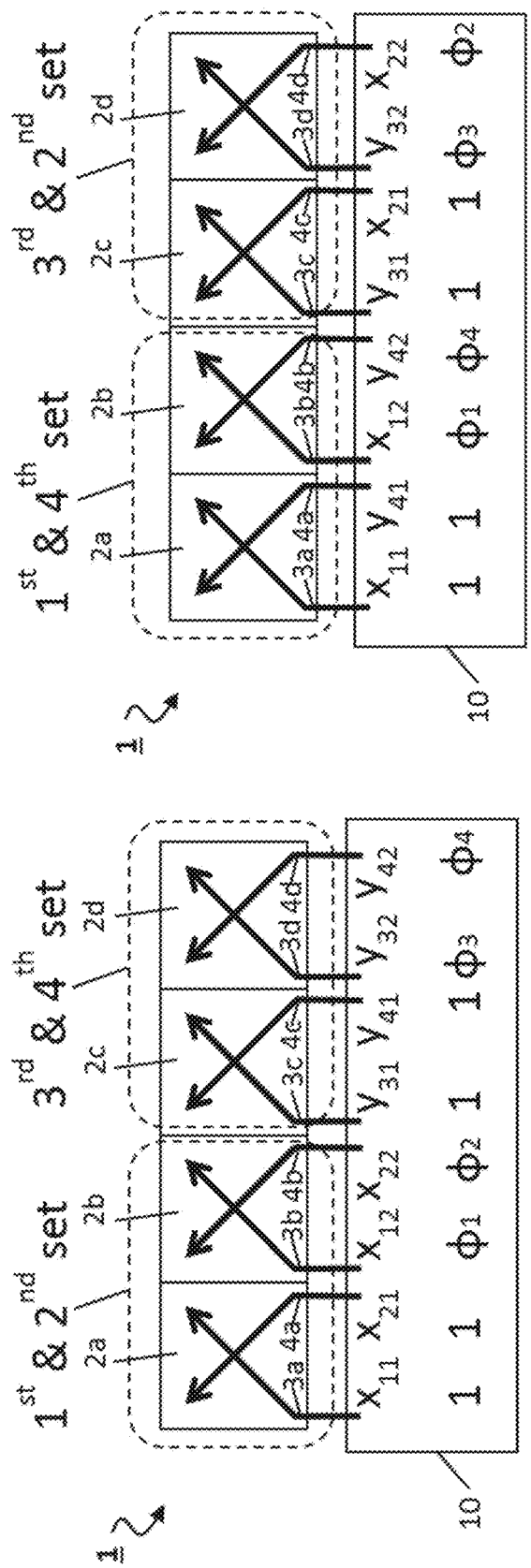
FIG. 1a) shows a schematic view of an embodiment of an apparatus and an antenna element array according to the present disclosure.
FIG. 1b) shows a schematic view of a further embodiment of an apparatus and an antenna element array according to the present disclosure.

FIG. 1 shows two schematic examples of a first embodiment, in which the antenna element array 1 consists of a minimum necessary number of dual polarized antenna elements 2a-2d. More specifically, the antenna element array 1 consists of four antenna elements 2a-2d arranged in a single row, so that the two antenna elements 2a-2b arranged on the left side form the first half of the antenna element array 1 and the two antenna elements 2c-2d arranged on the right side form the second half of the antenna element array 1. Both halves are symmetrical to each other. In the wording of the claims, the four antenna elements 2a-2d are arranged in a single row, and each of the antenna elements 2a-2d forms a single antenna element 2a-2d of the respective column, which will be explained in more detail below.

FIG. 1 also schematically shows the apparatus 10 for generating broadcast beams according to the disclosure. The apparatus 10 can be any kind of means, processor, controller, unit and so forth configured and adapted to feed the first broadcast beam signal and a second broadcast beam signal to the respective dual polarized antenna elements 2a-2d of antenna element array 1, i.e. their respective inputs 3a-3d and 4a-4d, in a way that broadcast beams are generated by the respective symmetrical halves of the antenna element array 1.

Hereby, the apparatus 10 in the wording of the claims, selects a first set of antenna elements 2a, 2b and a third set of dual polarized antenna elements 2c, 2d, wherein the first set and the third set are arranged in the two different halves of the antenna element array 1. Also, the apparatus 10 is configured to select a second set of antenna elements 2a, 2b (FIG. 1*a*) or 2c, 2d (FIG. 1*b*) and a fourth set of antenna elements 2c, 2d (FIG. 1*a*) or 2a, 2b (FIG. 1*c*), whereby the second set and the fourth set are arranged in the two different halves of the antenna element array 1.

FIG. 1*a* and FIG. 1*b* show the two different possible examples for choosing of the sets of antenna elements. In FIG. 1*a* each of the antenna elements 2a, 2b of the left half belongs to the first set and the second set whereas each of the antenna elements 2c, 2d of the right half belongs to the third set and the fourth set. In FIG. 1*b* each of the antenna elements 2a, 2b of the left half belongs to the first set and the fourth set whereas each of the antenna elements 2c, 2d of the right half belong to the third set and the second set.

Hence, in the first example shown in FIG. 1*a*, the first set and the second set of antenna elements are the same and arranged in the left half, and the third set and the fourth set of antenna elements are the same and are arranged in the right half of the antenna element array 1. In the second example FIG. 1*b*, the first set and the fourth set of antenna elements are the same and arranged in the left half, and the third set and the second set of antenna elements are the same and arranged in the right half of the antenna element array 1.

It can be seen that the apparatus 10 may select the sets of dual polarized antenna elements such that each dual polarized antenna element 2a-2d of the antenna element array is comprised in exactly two of the sets of dual polarized antenna elements. Hence, the full antenna array 1 is used for generating the broadcast beams.

Further, the apparatus 10 is configured to generate a first broadcast beam by feeding the first broadcast beam signal to the first set of antenna elements 2a, 2b at the respective first inputs 3a, 3b for the first polarization and to feed the first broadcast beam signal also to the second set of antenna elements 2a, 2b (FIG. 1*a*) or 2c, 2d (FIG. 1*b* at their respective second inputs 4a, 4b (FIG. 1*a*) or 4c, 4d (FIG. 1*b*) for the second polarization.

Further, the apparatus 10 is adapted to generate a second broadcast beam by feeding the second broadcast beam signal to the third set of antenna elements 2c, 2d at their respective first inputs 3c, 3d for the first polarization and to the fourth set of antenna elements 2c, 2d (FIG. 1*a*) or 2a, 2b (FIG. 1*b*) at their respective second inputs 4c, 4d (FIG. 1*a*) or 4a, 4b (FIG. 1*b*) for the second polarization. As mentioned, the second polarization is orthogonal to the first polarization.

This situation and the way the first and the second broadcast beam signals are fed to the respective inputs 3a-3d of the various antenna elements 2a-2d is shown in FIG. 1. Each of the inputs 3a-3d and 4a-4d of the antenna elements 2a-2d has a respectively allocated index where z indicates the broadcast beam signal or more specific the respective first or second broadcast beam signal fed to the respective input 3a-3d or 4a-4d. In the shown example, x indicates the first broadcast beam signal for generating the first broadcast beam and y indicates the second broadcast beam signal for generating the second broadcast beam. The parameter m indicates the respective set of antenna elements 2a-2d, i.e. the first, second, third or fourth set. The parameter n indicates the respective column of the set. In FIG. 1, each column only comprises a single antenna element 2a, 2b, 2c, or 2d of the antenna element array 1, however, in the example of FIGS. 2*a*) and *b*), each column comprises two respective antenna elements 2a, 2b, 2c, or 2d, and in FIG. 3, each column comprises four respective antenna elements 2. Of course the number of columns of the antenna array 1 is arbitrary.

The apparatus 10 may select the sets of dual polarized antenna elements 2, 2a-d such that, each set comprises at least two columns and at least one row of dual polarized antenna elements. The first inputs 3, 3a-3d of dual polarized antenna elements 2, 2a-2d in the same column are configured to receive the same signal and the first inputs 3, 3a-3d of dual polarized antenna elements 2, 2a-2d in the same row are separated from each other. The second inputs 4, 4a-4d of dual polarized antenna elements 2, 2a-2d in the same column are configured to receive the same signal and the second inputs 4, 4a-4d of dual polarized antenna elements 2, 2a-2d in the same row are separated from each other. This structure can be best seen in FIG. 2 and FIG. 3 where are more than one row is illustrated.

As shown in FIG. 1*a*), the left half of the antenna elements 2, i.e. the first two antenna elements 2a, 2b, receive the first broadcast beam signal x, and the second half of antenna elements, i.e. the second two antenna elements 2c, 2d receive the second broadcast beam signal indicated by y. Each broadcast beam signal x and y is fed to the respective inputs 3a-3d and 4a-4d with the same amplitude, for example a normalized amplitude of 1.

However, the phases of the first and second broadcast beam signals applied to the various inputs 3a-3d and 4a-4d vary from each other. For example, the apparatus 10 may apply a first phase shift φ1 to the first broadcast beam signal before feeding it to the first input(s) (3b) of the at least second column of the first set of dual polarized antenna elements 2b and a second phase shift φ2 to the first broadcast beam signal before feeding it to the second input(s) (4b) of the at least second column of the second set of dual polarized antenna elements 2b. It should be emphasized again that in the example of FIG. 1a mentioned second columns of the first set and second set comprises only the single dual polarized antenna element 2b. The first phase shift φ1 and the second phase shift φ2 are different from each other.

The apparatus 10 may also apply a third phase shift φ3 to the second broadcast beam signal before feeding it to the first input(s) 3c of the at least second column of the third set of dual polarized antenna elements 2c and a fourth phase shift φ4 to the second broadcast beam signal before feeding it to the second inputs 4d of the at least second column of the fourth set of dual polarized antenna elements (2d, 2b) It should be emphasized again that in the example of FIG. 1a mentioned second columns of the third set and fourth set comprise only the single dual polarized antenna element 2d. The third phase shift and the fourth phase shift are different from each other.

Optionally, the first phase shift φ1 and third phase shift φ3 are equal and the second phase shift φ2 and fourth phase shift φ4 are equal.

As schematically shown in the example FIG. 1a, the first broadcast beam signal $x_{11}$ and $x_{21}$ which are fed to the respective input 3a and 4a of the first antenna element 2a each have the phase "1". However, the first broadcast beam signals $x_{12}$ and $x_{22}$ fed to the respective inputs 3b and 4b of the second antenna element 2b of the first half have the respective phase "Φ1" and "Φ2". Similarly, the second broadcast beam signals $y_{31}$ and $y_{41}$ applied to the inputs 3c and 4c of the first antenna element 2c of the second half respectively have a phase of "1", whereas the second broadcast beam signals $y_{32}$ and $y_{42}$ which are applied to the first and second inputs 3d and 4d, respectively, of the second antenna element 2d of the second half respectively comprise a phase "Φ3" and "Φ4".

For example, the phases "Φ1" and "Φ2" could indicate a phase difference or phase shift of 180° in relation to the phases "1" of $x_{11}$ and $x_{21}$. Similarly, the phases "Φ3" and "Φ4" could indicate a phase difference or phase shift of 180° in respect to the phases "1" of $y_{31}$ and $y_{41}$. However, other phase differences could be applied by the apparatus 10 depending on the specific shape of the antenna element array 1 and/or the required configuration of the first and second broadcast beam.

With the selection of the sets and the corresponding feeding as shown in FIG. 1a the first broadcast beam with its two orthogonal sub beams is completely generated by the antenna elements 2a, 2b of the same first half of the antenna element array 1. Furthermore, the second broadcast beam with its two orthogonal sub beams is completely generated by the antenna elements 2c, 2d in the same second half of the antenna element array 1.

However, in the example shown in FIG. 1b, in the first half of the antenna element array 1, the first broadcast beam signal x is applied as $x_{11}$ and $x_{12}$ to the first inputs 3a-3b of the first and the second antenna elements 2a-2b of the first half of the antenna element array 1, wherein $x_{12}$ has a phase difference of "Φ1" as compared to the phase "1" of $x_{ii}$. The second broadcast beam signal y in the form of $y_{41}$ and $y_{42}$ is respectively fed to the second inputs 4a-4b of the first and second antenna elements 2a-2b of the first half of the array 1, respectively with a phase of "1" and "Φ4". In the second half of the antenna element array 1, the first broadcast beam signal x is applied to the second inputs 4c, 4d of the two antenna elements 2c, 2d of the second half in the form of $x_{21}$ (input 4c) and with a phase "1" and $x_{22}$ (input 4d) with a phase "Φ2". Furthermore. the second broadcast beam signal is to the first inputs 3c-3d of the two antenna elements 2c-2d of the second half in the form of $y_{31}$ with phase "1" (input 3c) and $y_{32}$ with phase "Φ3" (input 3d). The comments in relation to the respective phase shifts or differences made in relation to FIG. 1a identically apply to FIG. 1b.

With the selection of the sets and the corresponding feeding as shown in FIG. 1b the first sub beam (having the first polarization) of the first broadcast beam is generated by the antenna elements 2a, 2b in the first half of the antenna element array 1 and the second sub beam (having the second polarization) of the first broadcast beam is generated by the antenna elements 2c, 2d in the second half of the antenna element 1. Furthermore, the first sub beam (having the first polarization) of the second broadcast beam is generated by the antenna elements 2c, 2d in the second half of the antenna element array 1 and the second sub beam (having the second polarization) of the second broadcast beam is generated by the antenna elements 2a, 2b in the first half of the antenna element 1.

Thus, under the control of the apparatus 10 which selectively feeds the first and second broadcast beam signals with the respectively different phases to the various inputs 3a-3d and 4a-4d of the antenna elements 2a-2d of the first and the second half of the antenna element array 1, the sub beams of the first and second broadcast beams are generated and broadcasted by respective halves of the antenna element array 1. It should be mentioned that the aforementioned selection of sets of antenna elements can be performed by the apparatus 10 by choosing at which of the inputs 3a-3d, 4a-4d of the antenna elements 2a-2d of the antenna element array 1, the broadcast beam signals x and y are applied.

Figure 2:
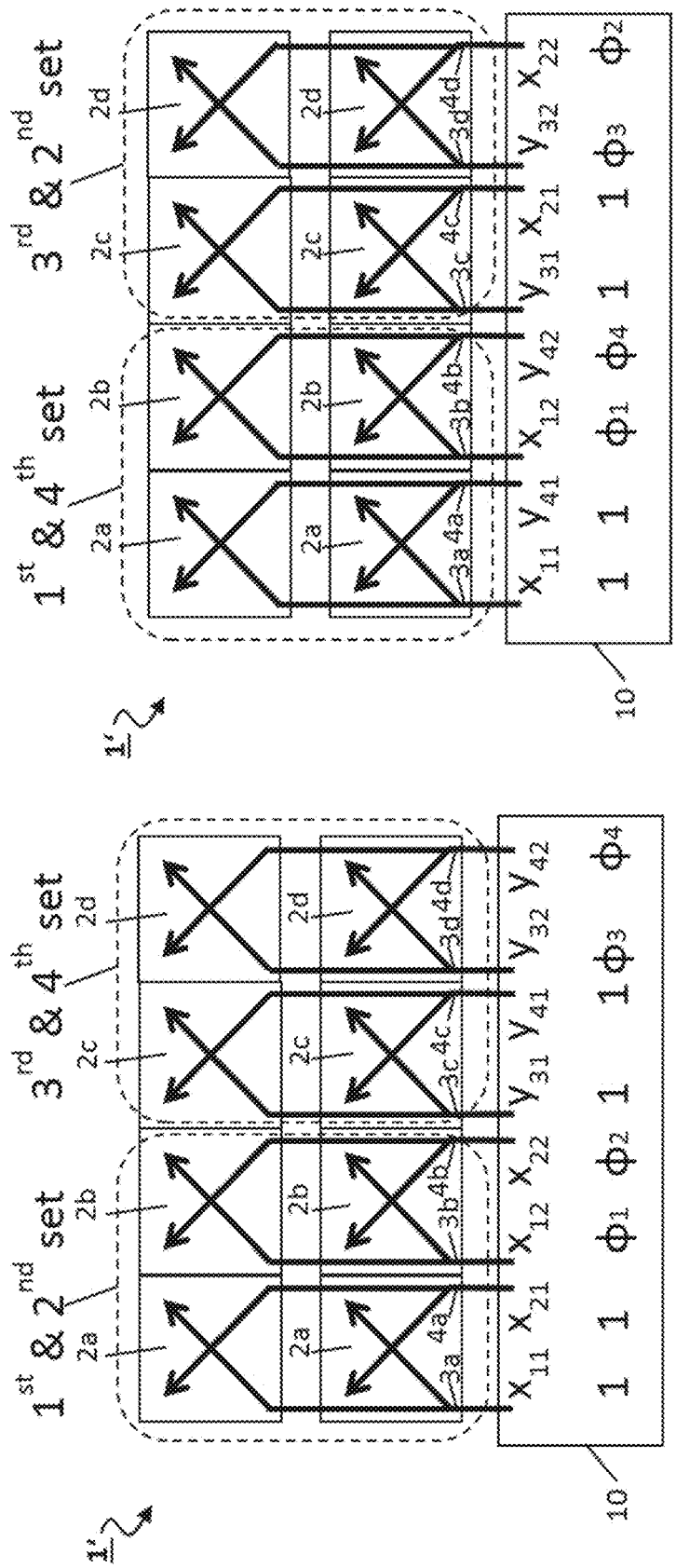
FIG. 2a) shows a schematic view of a further embodiment of an apparatus and an antenna element array according to the present disclosure.
FIG. 2b) shows a schematic view of a further embodiment of an apparatus and an antenna element array according to the present disclosure.

FIG. 2 shows two further examples a and b, in which the respective antenna element array 1' comprise 8 dual polarized antenna elements 2a-2d, wherein four antenna elements 2a-2b are arranged in the first half and four antenna elements 2c-2d are arranged in the second half. The first and the second half, i.e. the antenna elements 2a-2b of the first half and the antenna elements 2c-2d of the second half are arranged symmetrical to each other in two rows and four respective columns, wherein each row comprises four antenna elements 2a-2d and each column comprises two antenna elements 2a, 2b, 2c or 2d. The first inputs 3a-3d of the two antenna elements 2a-2d of each column are connected to each other and the second inputs 4a-4d of the antenna elements 2a-2d of each column are connected to each other, which means that the same signals and the same phase are applied to these inputs. However, the first inputs 3a-3d and the second inputs 4a-4d of the antenna elements 2a-2d in the same row are separated from each other can therefore be fed separately.

The feeding of the first and the second broadcast beam signals and the respective phases to the various inputs 3a-3d and 4a-4d of FIG. 2a is identical to FIG. 1a. Similarly, the feeding of the first and the second broadcast beam signals with the respective phases to the various inputs 3a-3d and 4a-4d in FIG. 2b is identical to FIG. 1b. All comments made above in relation to FIGS. 1a and 1b thus apply identically.

In the following description, for simplicity, all antenna elements will be given the reference sign 2, all first inputs will be given the reference sign 3 and all second inputs will be given the reference sign 4.

Figure 3:
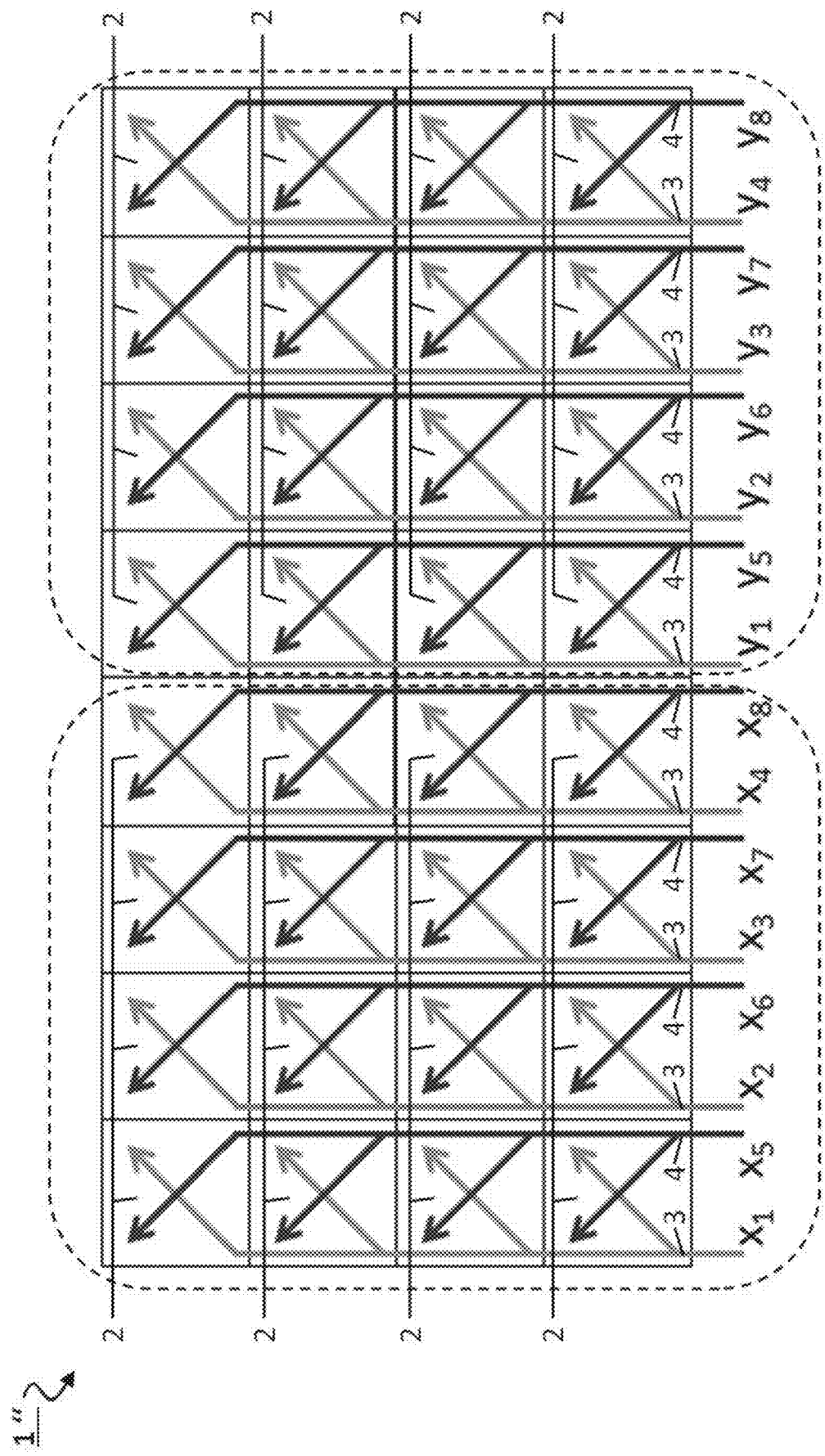
FIG. 3 shows a schematic view of a further embodiment of an apparatus and an antenna element array according to the present disclosure.

FIG. 3 shows a further example of an antenna element array 1", in which each of the symmetric halves of the antenna element array 1" consists of 16 dual polarized antenna elements 2, which are arranged in four rows and 8 columns hence, each half of the antenna element 1" comprises 4 columns and 4 rows. In the example shown in FIG. 3, the apparatus 10 is not shown, but it should be understood that the arrangement of the apparatus 10 of the present disclosure is similar as in FIGS. 1 and 2. In each column of antenna elements, the respective first inputs 3 are connected to each other and the second inputs 4 are connected to each other and respectively fed with the same (first of second) broadcast beam signal. The magnitude (or amplitude) of the respective first and second broadcast beam signal applied to the various inputs 3 and 4 is always the same, but the respective phases are different from each other, similar to the situations explained in more detail in relation to FIGS. 1 and 2.

FIG. 3 shows a further example, which corresponds in substance to the examples shown in and explained in relation to FIGS. 1a and 2a, i.e. where the first and the second set of antenna elements 2 is the same and is located in the first half of the antenna element array 1", and where the third and the fourth set of antenna elements 2 are the same and located in the second half of the antenna element array 1". This is visualized by the notation of the first broadcast beam signals $x_n$ and the second broadcast beam signals $y_n$ shown in FIG. 3, where n=1, 2, 3, . . . 8. For example, in the first half, the first broadcast beam signal x is fed to the first and second inputs 3, 4 of the antenna elements 2 in the first two columns as it is i.e. with a phase "1", and to the first and second inputs 3, 4 of the antenna elements 2 in the third and the fourth column with a phase "−1", i.e. a phase which is 180° in relation to the first broadcast beam signal supplied to the antenna elements 2 in the first two columns. In the example of FIG. 3, signals $x_1$, $x_5$, $x_2$ and $x_6$ thus have no phase shift, i.e. phase "1", whereas signals $x_3$, $x_7$, $x_4$ and $x_8$ have a phase of "−1". Alternative, signals $x_1$, $x_5$, $x_2$ and $x_6$ could have a phase of "−1", whereas signals $x_3$, $x_7$, $x_4$ and $x_8$ could have a phase of "1".

In the second half of the antenna element array 1" of FIG. 3, the second broadcast beam signal is supplied as it is, i.e. with a phase "1" to the first and second inputs 3, 4 of the respective antenna elements 2 in the first column as well as in the fourth column. In other words, signals $y_1$, $y_5$ and $y_4$ and $y_8$ are the second broadcast signal as it is, i.e. with a phase "1". However, the second broadcast beam signal as supplied to the inputs 3 and 4 of the antenna elements 2 in the second and the third column of the second half have a phase shift of "Φ" in relation to the second broadcast signal as it is. This phase shift "Φ" can be selectively chosen depending on the wanted implementation. For example this phase shift could be 180° but also be different from this. Thus, for the first broadcast beam generated in the first half of the antenna element array 1", here is a phase difference of 180° applied to one half of the inputs of the antenna elements 2, and in the second half of the antenna elements, the phase shift applied to one half of the inputs is Φ, which can be adjusted in the apparatus 10 according to the disclosure depending on the used antenna architecture to give the optimum pattern for the second broadcast beam.

Hence, in this example the two sub beams of the first broadcast beam are generated by the first half of the antenna element array 1" and the two sub beams of the second broadcast beam are generated by the second half of the antenna element array 1". This example may also be altered analogously as shown in conjunction which FIGS. 1b and 2b so that the sub beams of the two broadcast beam are respectively generated in different halves of the antenna element array 1".

The complete concept described herein, may be extended to an arbitrary number of antenna elements 2, of an antenna element array as long as the antenna element array can be divided into two halves which are symmetric to each other.

In the following FIGS. 4A, 4B and 4C, examples for the beams generated by the antenna element array 1" of the example of FIG. 3 are shown.

Figure 4A:
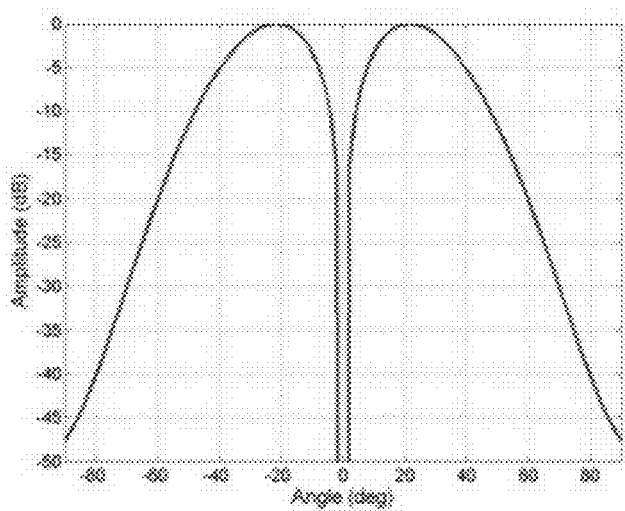
FIG. 4A shows the horizontal pattern of a first sub-beam (sub-beam 1) of a broadcast beam vs. the azimuth
Figure 4B:
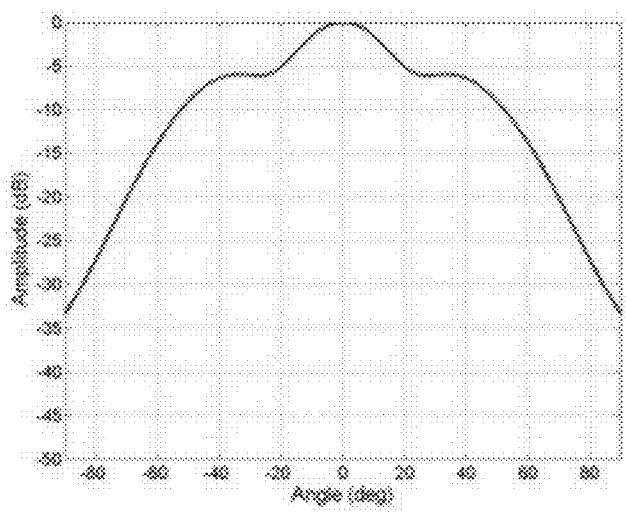
FIG. 4B shows the horizontal pattern of a second sub-beam (sub-beam 2) of the broadcast beam vs. the azimuth
Figure 4C:
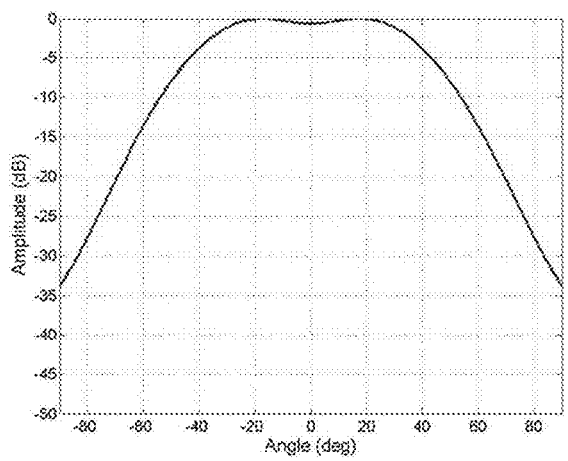
FIG. 4C shows the horizontal pattern of the broadcast beam vs. the azimuth

FIG. 4A shows the horizontal pattern of a first sub-beam (sub-beam 1) of a broadcast beam vs. the azimuth in an embodiment of the present disclosure. FIG. 4B shows the horizontal pattern of a second sub-beam (sub-beam 2) of the broadcast beam vs. the azimuth and FIG. 4C shows the horizontal pattern of the broadcast beam vs. the azimuth when the two polarizations of the two sub-beams are added in power. One can clearly see in FIGS. 4A and B that the first sub-beam (sub-beam 1) and the second sub-beam (sub-beam 2) do not show many zeros, but only the first sub-beam has a transmission zero in the middle of the pattern. Even if this zero is shifted or reduced slightly by phase inaccuracy of a non-ideal antenna excitation, the broadcast beam as shown in FIG. 4C will remain relatively stable.

Figure 5A:
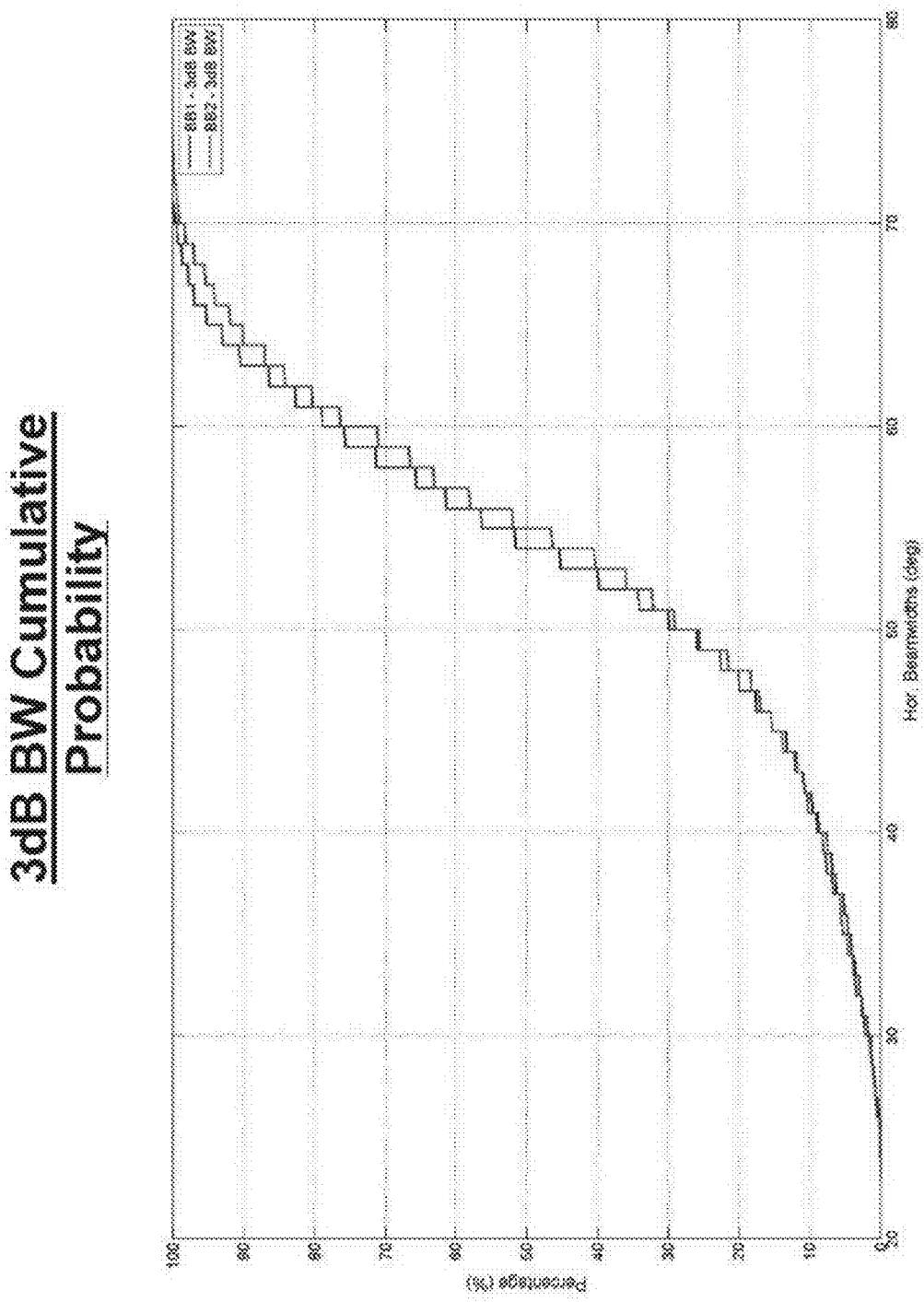
FIG. 5A shows a cumulative probability vs. the horizontal 3 dB beamwidth in the prior art.
Figure 5B:
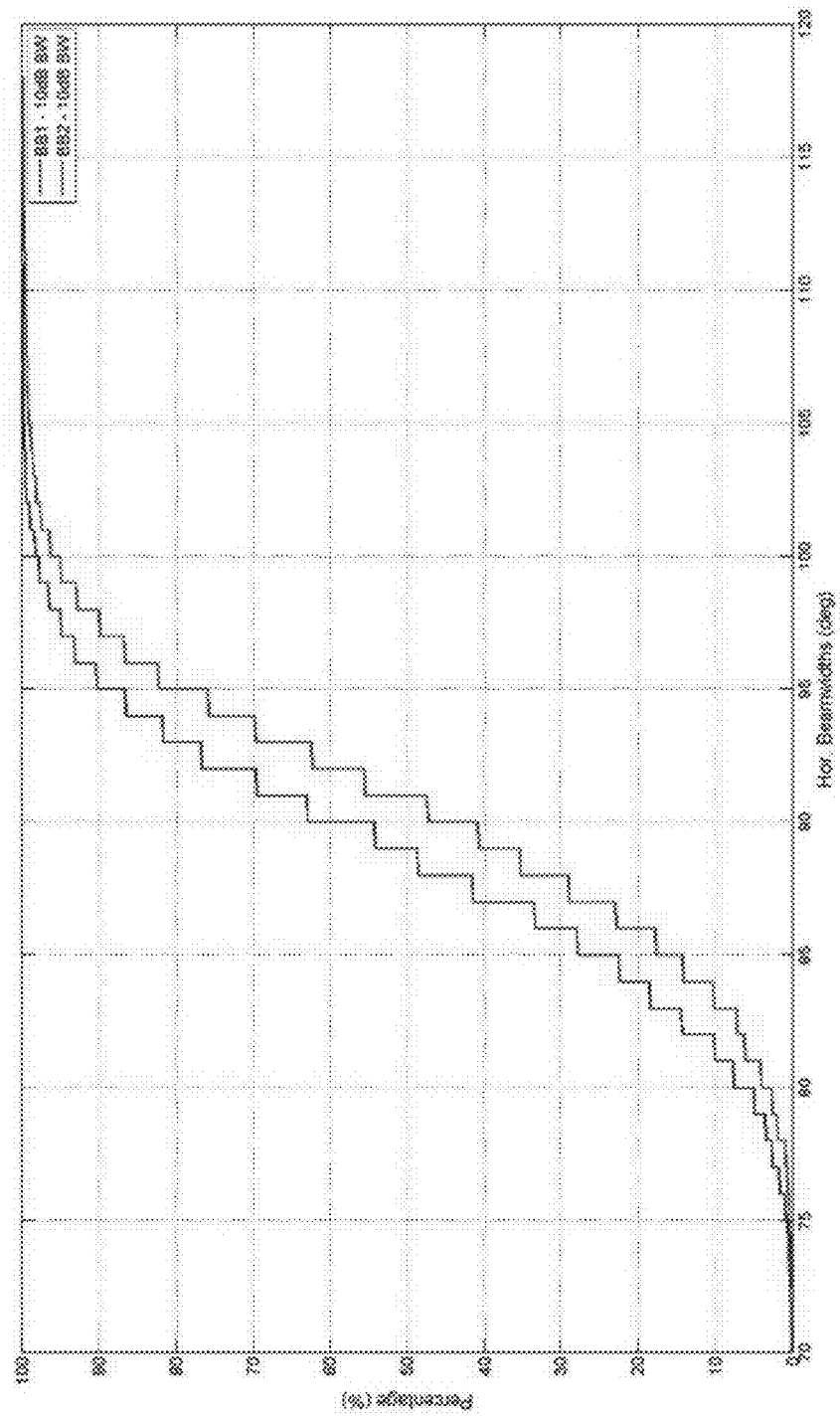
FIG. 5B shows a cumulative probability vs. the horizontal 10 dB beamwidth in the prior art.
Figure 6A:
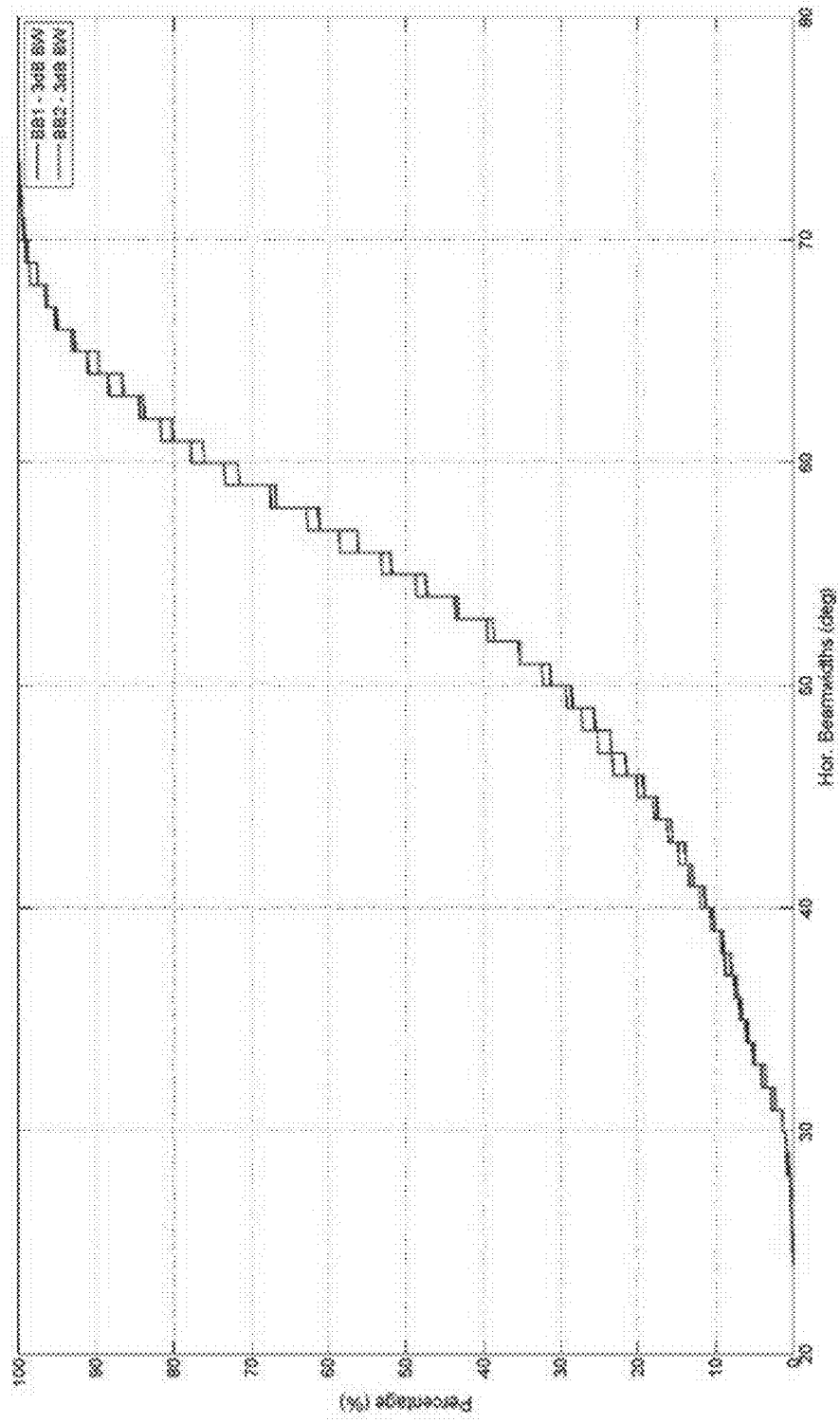
FIG. 6A shows a cumulative probability vs. the horizontal 3 dB beamwidth according to an embodiment of the present disclosure.
Figure 6B:
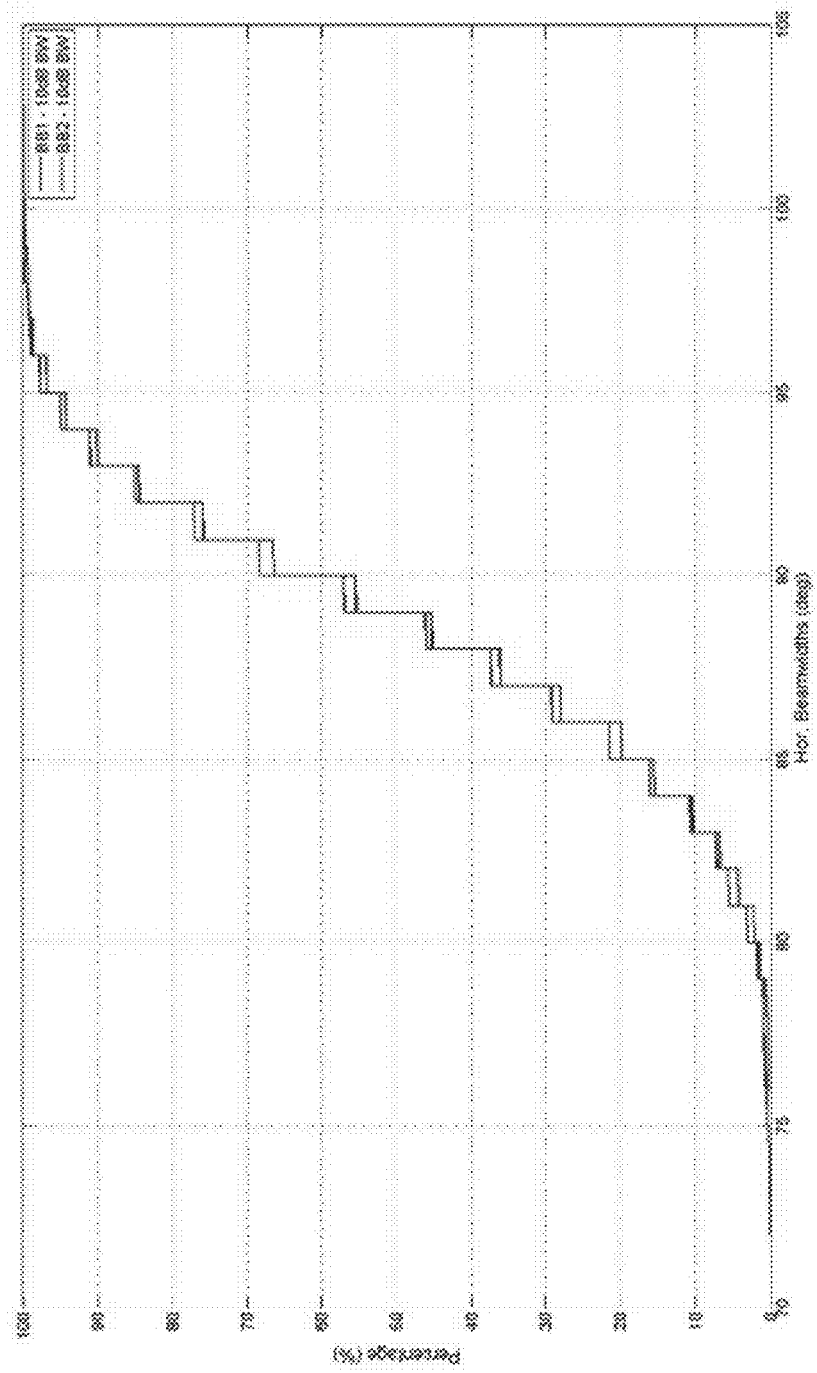
FIG. 6B shows a cumulative probability vs. the horizontal 10 dB beamwidth according to an embodiment of the present disclosure.

For showing the stability, a statistical analysis is carried out in FIGS. 5A, 5B, 6A and 6B with an expected phase deviation of ±25° and an amplitude deviation of ±2.5 dB. The phase errors are applied to the broadcast beam of a prior art solution in FIGS. 5A and 5B and the broadcast beam according to a solution of the present disclosure in FIGS. 6A and 6B. In particular, FIGS. 5A and 5B, showing the prior art solution, show a plot of the cumulative probability on the y-axis for reaching a horizontal 3 dB beamwidth (FIG. 5A) and the cumulative probability on the y-axis for reaching a horizontal 10 dB beamwidth (FIG. 5B). There, one can clearly see that in FIGS. 5A and 5B the two broadcast beams BB1 and BB2 start to have different beam widths under the influence of random phase errors. As a consequence, more users will be supplied with one of the two broadcast beams, which can lead to system imbalance as more users are logged in one of the two broadcast beams. In contrast thereto, with embodiments of the present disclosure, as one can see in FIGS. 6A and 6B, the corresponding cumulative probabilities are shown for the horizontal 3 dB beamwidth (FIG. 6A) and the horizontal 10 dB beamwidth (FIG. 6B), there the two broadcast beams BB1 and BB2 have a similar behavior under the influence of phase errors.

Furthermore, FIG. 7 shows different sets of excitation vectors, wherein each excitation vector contains values x1-x8, and each of the values x1-x8 defines the amplitude and phase of the corresponding signal fed to the antenna array. In particular, the values x1-x4 serve for generating the first sub-beam and the values x5-x8 serve for generating the second sub-beam.

Figure 8:
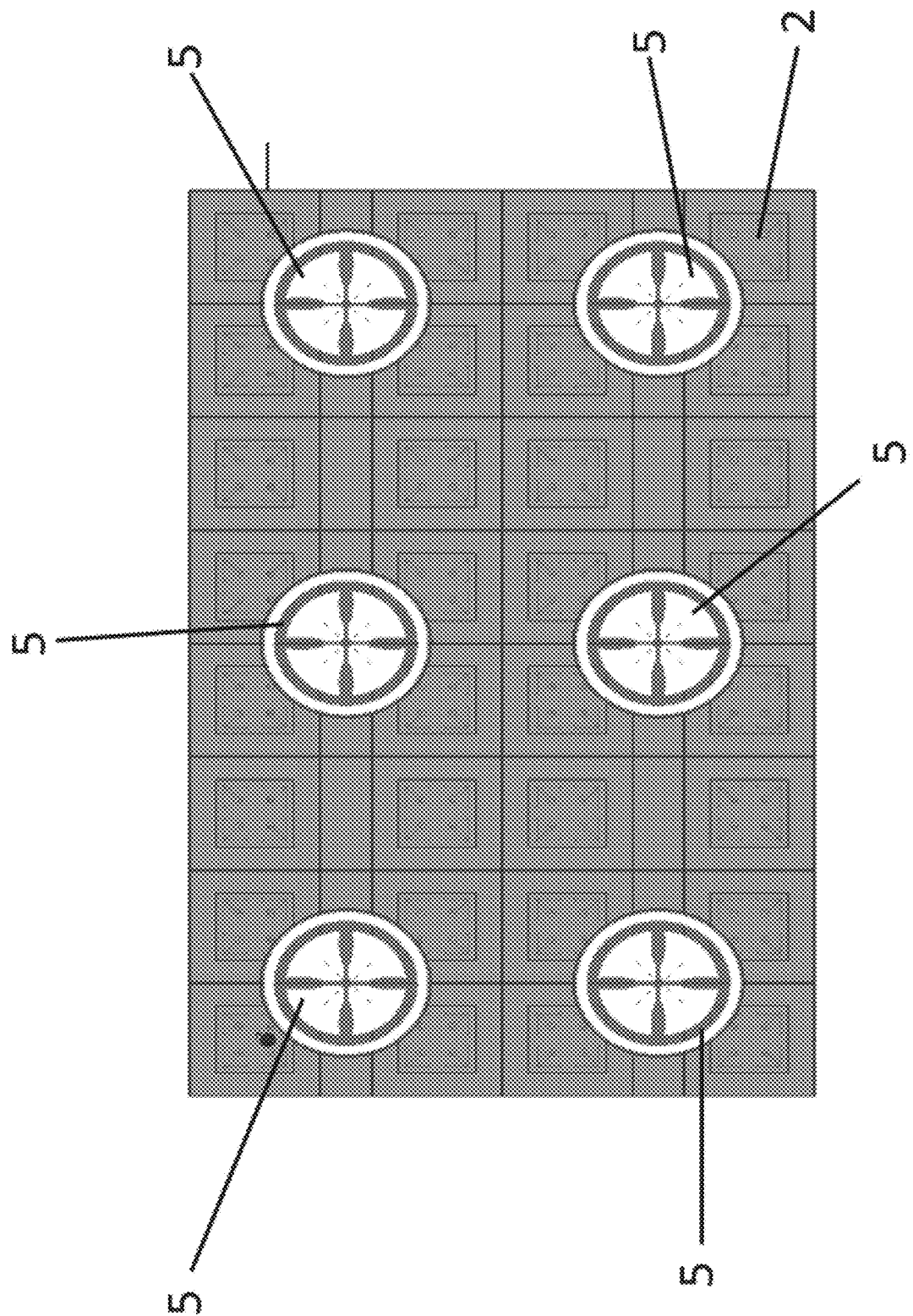
FIG. 8 shows an active antenna comprising further antenna elements arranged between dual-polarized antenna elements of an antenna element array.

FIG. 8 shows an active antenna in which the antenna element array, being for example a Massive-MIMO antenna element array, according to an embodiment of the present disclosure is provided together with further antenna elements 5, for example, dipole antennas arranged between the dual-polarized antenna elements 2. The operating frequency of the further antenna elements 5 can be different (preferably smaller) than the operating frequency of the dual polarized antenna elements 2. Therefore, embodiments of the present disclosure has the further advantage that the broadcast beams broadcasted by the antenna element array are showing a more stable behavior when the antenna element array is provided together with other dipole antennas in a multi band array. Each antenna element 2 within the antenna element array in FIG. 8 is exposed to a different radiation environment, since the dipole antennas itself radiates and therefore each antenna element 2 is exposed to a different disturbance generated by the dipole antennas. This leads to a very different single radiation pattern for each antenna element 2 and therefore there is a huge deviation in phase and amplitude for each antenna element 2. However, by the symmetric broad cast beam generation as achieved by the embodiments of the present disclosure the overall radiation pattern of the broadcast beams is very stable and therefore the influence of the dipole antennas is minimized.

Figure 9:
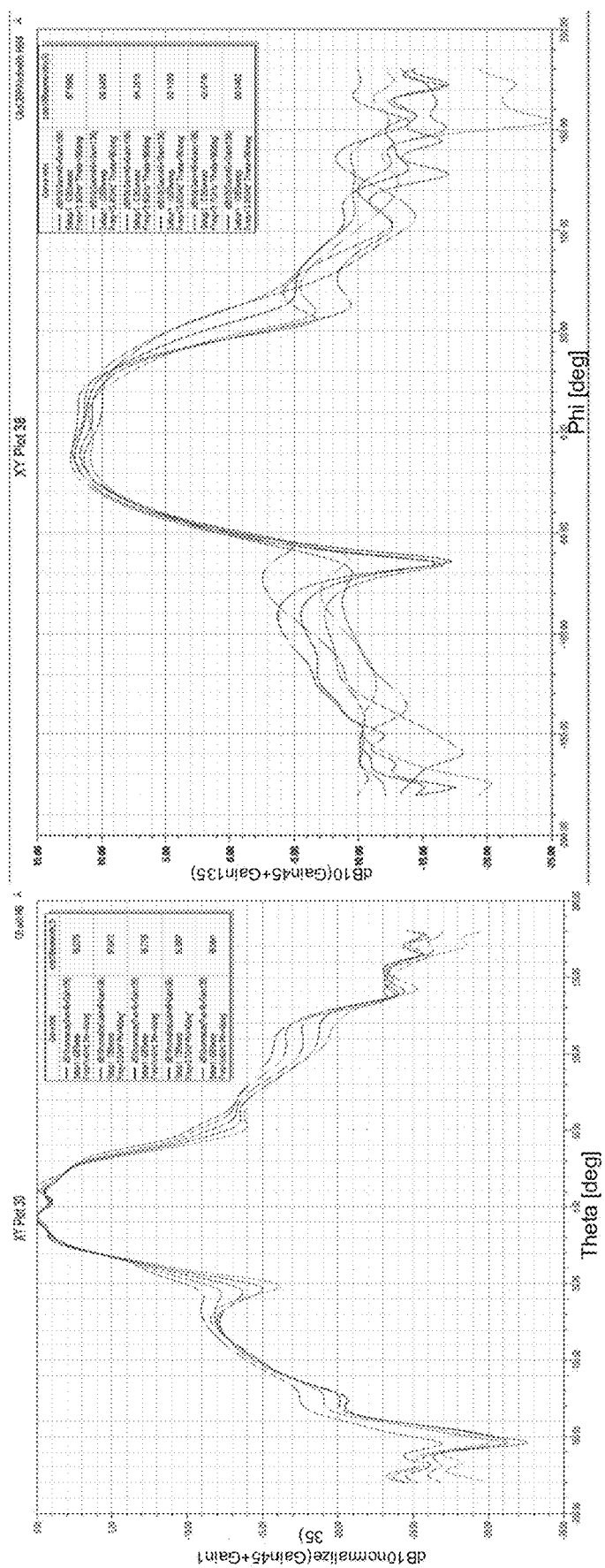
FIG. 9 shows a comparison of broadcast beams for an active antenna comprising further antenna elements arranged between dual-polarized antenna elements of an antenna element array of a prior art solution (left side) and a solution of the present disclosure (right side).

In this context, FIG. 9 shows a comparison of the broadcast beams of a system comprising the antenna element array together with the further antenna elements. On the left side a prior art radiation pattern is shown, and on the right side a radiation pattern of the present disclosure is shown. There, one can clearly see that the method of the present disclosure leads to a better performance regarding the half power beamwidth as compared to the prior art solution shown on the left side of FIG. 9.

Therefore, the present apparatus for generating the broadcast beams allows for providing broadcast beams, which are more robust against amplitude and phase errors of excitation signals and allows to accurately synthesize the sub-beams to an overall broadcast beam. Furthermore, polarization diversity is also valid, since, as one can clearly see from FIGS. 4A and 4B, it doesn't matter where the user is positioned with respect to the antenna element array. The user always receives a certain signal of a certain polarization. Therefore, polarization diversity is preserved.

Further, is should be noted that the number of antenna elements, the number of rows and columns of the sets of dual polarized antenna elements can be freely chosen and the present embodiments are just examples not restricting the scope of the present disclosure. The same applies to the signals fed to the first and second inputs, which are just examples in the present embodiments and can in principle be freely chosen.

Furthermore, it should be noted that the present disclosure is also directed to a corresponding method for generating broadcast beams and a program, which causes the apparatus to perform the corresponding method steps. However, these method steps are completely corresponding to what is mentioned above with respect to the apparatus itself and therefore for avoiding a repetition of disclosure the corresponding method steps are not repeated here again.

The disclosure has been described in conjunction with various embodiments herein. However, other variations to the enclosed embodiments can be understood and effected by those skilled in the art and practicing the claimed disclosure, from a study of the drawings, the disclosure and the appended claims. In these claims, the word "comprising" does not exclude other elements or steps and the indefinite article "a" or "an" does not exclude a plurality. A single processor or another unit may fulfill the function of several items recited in the claims. The mere fact that certain measures are recited in mutually different dependent claims does not indicate that a combination of these measures cannot be use to advantage. A computer program may be stored/distributed on a suitable medium, such as an optical storage medium or a solid state medium supplied together with or as part of another hardware, but may also be distributed in another form, such as via the Internet or other wired or wireless telecommunications systems.

What is claimed is:

1. A method of operating an antenna element array to generate a first broadcast beam and a second broadcast beam, the method comprising:

selecting from the antenna element array a first set of dual polarized antenna elements and a third set of dual polarized antenna elements, wherein the antenna element array comprises a plurality of dual polarized antenna elements, each dual polarized antenna element having a first input for a first polarization and a second input for a second polarization, and wherein each of the first set of dual polarized antenna elements and the third set of dual polarized antenna elements is arranged in a different half of the antenna element array;

selecting from the antenna element array a second set of dual polarized antenna elements and a fourth set of dual polarized antenna elements, wherein each of the second set of dual polarized antenna elements and the fourth set of dual polarized antenna elements is arranged in a different half of the antenna element array;

generating the first broadcast beam by feeding a first broadcast beam signal to the first input of each dual polarized antenna element of the first set and to the second input of each dual polarized antenna element of the second set; and generating the second broadcast beam by feeding a second broadcast beam signal to the first input of each dual polarized antenna element of the third set and to the second input of each dual polarized antenna element of the fourth set, wherein the second polarization is orthogonal to the first polarization.

2. The method according to claim 1, further comprising:
selecting the first and second sets of dual polarized elements such that they are the same sets being arranged in a first half of the antenna element array, and selecting the third and fourth sets of dual polarized antenna elements such that they are the same sets being arranged in a second half of the antenna element array.

3. The method according to claim 1, further comprising:
selecting the first and fourth sets of dual polarized elements such that they are the same sets being arranged in a first half of the antenna element array, and selecting the second and third sets of dual polarized antenna elements such that they are the same sets being arranged in a second half of the antenna element array.

4. The method according to claim 1, further comprising:
selecting the first, second, third and fourth sets of dual polarized antenna elements such that each set of dual polarized antenna elements comprises at least two columns and at least one row of dual polarized antenna elements, wherein the first inputs of dual polarized antenna elements in the same column are configured to receive the same signal and the first inputs of dual polarized antenna elements in the same row are separated from each other and the second inputs of dual polarized antenna elements in the same column are configured to receive the same signal and the second inputs of dual polarized antenna elements in the same row are separated from each other.

5. The method according to claim 4, further comprising:
generating the first broadcast beam by feeding the first broadcast signal to the first inputs of at least a first column of the first set of dual polarized antenna elements and to the second inputs of at least a first column of the second set of dual polarized antenna elements, and by feeding the first broadcast signal to the first inputs of at least a second column of the first set of dual polarized antenna elements and to the second inputs of at least a second column of the second set of dual polarized antenna elements with a phase shift applied to the first broadcast beam signal; and generating the second broadcast beam by feeding the second broadcast signal to the first inputs of at least a first column of the third set of dual polarized antenna elements and to the second inputs of at least a first column of the fourth set of dual polarized antenna elements, and by feeding the second broadcast signal to the first inputs of at least a second column of the third set of dual polarized antenna elements and to the second inputs of at least a second column of the fourth set of dual polarized antenna elements with a phase shift applied to the second broadcast beam signal.

6. The method according to claim 5, further comprising:
applying a phase shift of 180 degrees to the first broadcast beam signal before feeding the first broadcast beam signal to the first inputs of the at least second column of the first set of dual polarized antenna elements; and
applying a phase shift of 180 degrees to the second broadcast beam signal before feeding the second broadcast beam signal to the first inputs of the at least second column of the third set of dual polarized antenna elements.

7. The method according to claim 5, further comprising:
applying a first phase shift to the first broadcast beam signal before feeding the first broadcast beam signal to the first inputs of the at least second column of the first set of dual polarized antenna elements, and applying a second phase shift to the first broadcast beam signal before feeding the first broadcast beam to the second inputs of the at least second column of the second set of dual polarized antenna elements, wherein the first phase shift and the second phase shift are different from each other; and
applying a third phase shift to the second broadcast beam signal before feeding the second broadcast beam signal to the first inputs of the at least second column of the third set of dual polarized antenna elements, and applying a fourth phase shift to the second broadcast beam signal before feeding the second broadcast beam signal to the second inputs of the at least second column of the fourth set of dual polarized antenna elements, wherein the third phase shift and the fourth phase shift are different from each other.

8. The method according to claim 7,
wherein the first phase shift and third phase shift are equal; and
wherein the second phase shift and fourth phase shift are equal.

9. The method according to claim 1, further comprising:
selecting the first, second, third, and fourth sets of dual polarized antenna elements such that each dual polarized antenna element of the antenna element array is comprised in exactly two of the sets of dual polarized antenna elements.

10. The method according to claim 1, further comprising:
feeding the first broadcast beam signal and the second broadcast beam signal to the inputs of the dual polarized antenna elements having the same excitation amplitude.

11. An active antenna comprising:
an antenna element array; and
a processor configured to:
select from the antenna element array a first set of dual polarized antenna elements and a third set of dual polarized antenna elements, wherein the antenna element array comprises a plurality of dual polarized antenna elements, each dual polarized antenna element having a first input for a first polarization and a second input for a second polarization, and wherein each of the first set of dual polarized antenna elements and the third set of dual polarized antenna elements is arranged in a different half of the antenna element array;
select from the antenna element array a second set of dual polarized antenna elements and a fourth set of dual polarized antenna elements, wherein each of the second set of dual polarized antenna elements and the fourth set of dual polarized antenna elements is arranged in a different half of the antenna element array;
generate a first broadcast beam by feeding a first broadcast beam signal to the first input of each dual polarized antenna element of the first set and to the second input of each dual polarized antenna element of the second set; and
generate a second broadcast beam by feeding a second broadcast beam signal to the first input of each dual polarized antenna element of the third set and to the second input of each dual polarized antenna element of the fourth set, wherein the second polarization is orthogonal to the first polarization.

12. The active antenna according to claim 11, wherein the antenna element array is a Massive Multiple Input Multiple Output (Massive MIMO) antenna element array.

13. The active antenna according to claim 11, further comprising:
at least a further antenna element arranged between the dual polarized antenna elements of the antenna element array.

14. The active antenna according to claim 13, wherein an operating frequency of the further antenna element is smaller than an operating frequency of the dual polarized antenna elements of the antenna element array.

15. A non-transitory computer-readable medium storing program code that, when executed by a computer, causes the computer to perform a method of operating an antenna element array to generate a first broadcast beam and a second broadcast beam comprising:
selecting from the antenna element array a first set of dual polarized antenna elements and a third set of dual polarized antenna elements, wherein the antenna element array comprises a plurality of dual polarized antenna elements, each dual polarized antenna element having a first input for a first polarization and a second input for a second polarization, and wherein each of the first set of dual polarized antenna elements and the third set of dual polarized antenna elements is arranged in a different half of the antenna element array;
selecting from the antenna element array a second set of dual polarized antenna elements and a fourth set of dual polarized antenna elements, wherein each of the second set of dual polarized antenna elements and the fourth set of dual polarized antenna elements is arranged in a different half of the antenna element array;
generating the first broadcast beam by feeding a first broadcast beam signal to the first input of each dual polarized antenna element of the first set and to the second input of each dual polarized antenna element of the second set; and generating the second broadcast beam by feeding a second broadcast beam signal to the first input of each dual polarized antenna element of the third set and to the second input of each dual polarized antenna element of the fourth set, wherein the second polarization is orthogonal to the first polarization.

16. The computer-readable medium according to claim 15, the method further comprising:

selecting the first and second sets of dual polarized elements such that they are the same sets being arranged in a first half of the antenna element array, and selecting the third and fourth sets of dual polarized antenna elements such that they are the same sets being arranged in a second half of the antenna element array.

17. The computer-readable medium according to claim 15, the method further comprising:

selecting the first and fourth sets of dual polarized elements such that they are the same sets being arranged in a first half of the antenna element array, and selecting the second and third sets of dual polarized antenna elements such that they are the same sets being arranged in a second half of the antenna element array.

18. The computer-readable medium according to claim 15, the method further comprising:

selecting the first, second, third, and fourth sets of dual polarized antenna elements such that each set of dual polarized antenna elements comprises at least two columns and at least one row of dual polarized antenna elements, wherein the first inputs of dual polarized antenna elements in the same column are configured to receive the same signal and the first inputs of dual polarized antenna elements in the same row are separated from each other and the second inputs of dual polarized antenna elements in the same column are configured to receive the same signal and the second inputs of dual polarized antenna elements in the same row are separated from each other.

19. The computer-readable medium according to claim 18, the method further comprising:

generating the first broadcast beam by feeding the first broadcast signal to the first inputs of at least a first column of the first set of dual polarized antenna elements and to the second inputs of at least a first column of the second set of dual polarized antenna elements, and by feeding the first broadcast signal to the first inputs of at least a second column of the first set of dual polarized antenna elements and to the second inputs of at least a second column of the second set of dual polarized antenna elements with a phase shift applied to the first broadcast beam signal; and generating the second broadcast beam by feeding the second broadcast signal to the first inputs of at least a first column of the third set of dual polarized antenna elements and to the second inputs of at least a first column of the fourth set of dual polarized antenna elements, and by feeding the second broadcast signal to the first inputs of at least a second column of the third set of dual polarized antenna elements and to the second inputs of at least a second column of the fourth set of dual polarized antenna elements with a phase shift applied to the second broadcast beam signal.

20. The computer-readable medium according to claim 19, the method further comprising:

applying a phase shift of 180 degrees to the first broadcast beam signal before feeding the first broadcast beam signal to the first inputs of the at least second column of the first set of dual polarized antenna elements; and applying a phase shift of 180 degrees to the second broadcast beam signal before feeding the second broadcast beam signal to the first inputs of the at least second column of the third set of dual polarized antenna elements.

* * * * *